Figures 1, 2:
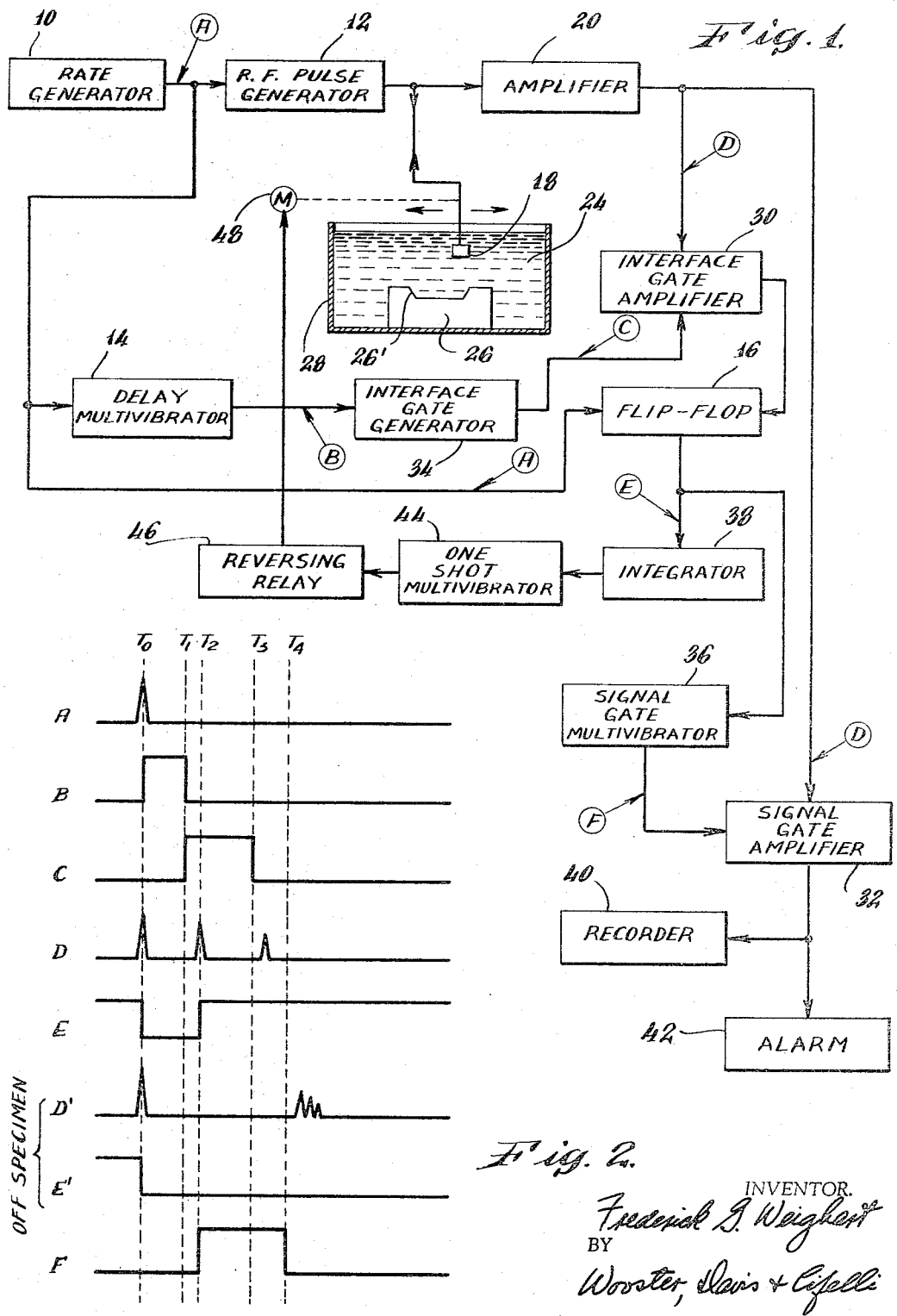

March 21, 1967  F. G. WEIGHART  3,309,913
ULTRASONIC INSPECTION
Filed Oct. 1, 1963

INVENTOR.
Frederick G. Weighart
BY
Wooster, Davis & Cifelli
ATTORNEYS.

United States Patent Office 3,309,913
Patented Mar. 21, 1967

3,309,913
ULTRASONIC INSPECTION
Frederick G. Weighart, Brookfield, Conn., assignor to Automation Industries, Inc., El Segundo, Calif., a corporation of California
Filed Oct. 1, 1963, Ser. No. 312,979
11 Claims. (Cl. 73—67.8)

This invention relates to an electronic system for automatic ultrasonic inspection using pulsed ultrasonic echo ranging.

The automatic inspection of engineering materials by pulse echo ranging techniques utilizing ultrasonics is now widely accepted throughout industry. Apparatus for practicing such a technique customarily includes a water-filled inspection tank which contains the specimen to be tested and an ultrasonic transducer which is mounted within the water and above the test specimen. The transducer is mounted on a motor operated carriage and is programmed to traverse the tank longitudinally in a series of back and forth motions which are transversely offset from one another. In this manner, the entire plan of the test specimen may be scanned by the transducer. The transducer is periodically energized by pulses of radio frequency energy which are converted by the transducer to corresponding mechanical waves of ultrasonic frequency. These mechanical waves are coupled into the test specimen by the water. Electrical signals which are generated from echoes received by the transducer during the interval preceding the next pulse are then amplified. The first echo which is received by such a transducer after the initial pulse is that from the interface between the water and the surface of the test specimen. The interface signal will be followed by signals produced by echoes from defects within the material of the test specimen and, finally, echoes will be received from the tank bottom upon which the test specimen rests.

In attempting to automate the ultrasonic inspection of materials, considerable progress has been achieved by employment of a gating system wherein the alarm or recorder circuits are not energized until receipt of the interface echo by the transducer. By utilizing a system of this type, inspection may be automatically conducted without regard to the profile of the inspected specimen. Systems of this type, for example, are disclosed in U.S. Patent 2,682,766 of H. E. Van Valkenburg and in U.S. Patent 2,883,860 of E. A. Henry.

Although depth programming of an inspection apparatus by means of the interface echo signal has been relatively successful, several deficiencies still exist. For example, it is desirable to restrict the motion of the transducer so as to scan only the test specimen and thereby avoid the waste of time involved in scanning areas off the test specimen. Furthermore, if the system is synchronized by the interface, the circuit has no way of differentiating between the interface signal and the signal from the tank bottom when off the surface of the specimen. Accordingly, when the transducer does go off the specimen, the circuit is apt to synchronize with the bottom signal and thereupon alarm on signals corresponding to multiples of the bottom thickness.

One technique employed in the prior art for solving these problems has been to utilize limit switches to program the travel of the ultrasonic transducer. When irregularly shaped test specimens have been scanned, it has been necessary to either program the switches for the particular specimen shape or to manually reset the limit switches as the test progressed.

To prevent alarming from echoes received from the tank bottom, the gate has been synchronized from the initial pulse rather than from the interface. However, this ignores the advantages of interface synchronizing and does not allow for any change in length of the water path. This requires both an accurate set-up and a smooth surface on the test specimen. It will be readily seen that in both solutions, some type of set-up has been required to assure the accurate positioning of the test specimen and this has consumed considerable time, particularly when test specimens of varying shapes are to be inspected.

Accordingly, it is a primary object of the present invention to provide an improved automatic scanning control for ultrasonic inspection of test specimens. Other objects are to eliminate the set-up time, to reduce the scanning time, to automatically restrict the scan to the surface of the test specimen, and to accomplish these objects in a simple and inexpensive manner. Further objects and advantages of this invention will be apparent from the following description, the appended claims, and the figures of the attached drawing wherein:

FIG. 1 is a block diagram of a pulsed ultrasonic inspection system embodying one form of this invention; and FIG. 2 is a wave form chart showing the relative time sequences in the respective portions of the system.

Referring to FIG. 1 of the drawings, the letters enclosed in circles correspond to the letters employed in FIG. 2. In FIG. 1 the rate generator 10 develops trigger pulses at time $T_0$ (see FIG. 2), and simultaneously triggers the RF pulse generator 12, the delay multi-vibrator 14, and the flip-flop 16. An RF pulse, or wave train, is generated by the RF generator 12 and impressed on the transducer 18 and preamplifier 20. The transducer converts the electrical wave train from pulse generator 12 into mechanical vibrations and transmits them into the coupling medium 24 between the transducer and the work piece 26 within tank 28. The electrical wave train impressed upon the preamplifier 20 at time $T_0$ (initial pulse) will have terminated a considerable time in advance of the arrival of an echo from the entrance surface $26'$ of the test specimen. This initial pulse will have been rejected by both a normally closed interface gate amplifier 30 and a normally closed signal gate amplifier 32, since both these gates are closed at time $T_0$.

The delay multi-vibrator 14 is adjusted to produce a square wave output pulse for the time $T_0$ to $T_1$. The time interval between $T_0$ and $T_1$ is long enough for the RF wave train to have terminated but is less than the time required for arrival of echo vibrations from the interface at entrance surface $26'$. This delay accordingly prevents the initial pulse from passing the interface gate. The trailing edge of the signal from the delay multivibrator 14 triggers the interface gate generator 34 which produces a square wave pulse having a duration from $T_1$ to $T_3$. This square wave activates the interface gate amplifier 30 so that the latter will pass the first subsequently reflected signal occurring during such period which is that from the interface at time $T_2$. After the interface gate has been thus opened to the interface signal, the interface signal will trigger the flip-flop 16. The full output of the flip-flop passes to integrator 38 and the flip-flop simultaneously provides a sychronizing signal to the signal gate multivibrator 36. So long as the interface signal appears during the gated interval set by gate generator 34, the flip-flop output will be predominantly positive. With this output positive, the output from the integrator 38 remains positive. However, the positive transition of the signal from flip-flop 16 does cause the signal gate multi-vibrator 36 to generate a square wave pulse which opens the signal gate amplifier 32 so that any subsequent defect signals are passed to the recorder 40 and the alarm 42. The length of the square pulse from signal gate multi-vibrator 36 is manually adjustable so that it will terminate just prior to reception of signals corresponding to echoes from the test piece bottom so as to prevent false alarming.

In the description up to this point it has been assumed that an interface signal has appeared which renders the output of flip-flop 16 predominantly positive. However, if the movement of transducer 18 has taken it beyond the limit of the test specimen 26, no such interface signal will occur. Under these conditions, the output of the flip-flop 16 remains negative. A negative signal is allowed to build up in the integrator 38 until it fires an 80 millisecond one shot multi-vibrator 44. The output of the multi-vibrator 44 activates a reversing relay 46 which controls the direction of control motor 48 causing the transducer carriage to reverse and scan the test specimen 26 in the opposite direction. At the same time, there is no positive transition to fire the signal gate multi-vibrator 36 so that the signal gate amplifier remains closed and the alarm and recorder are thereby disabled. In this regard, attention is directed to wave forms D' and E' of FIG. 2. These wave forms are taken at the same locations on FIG. 1 as wave forms D and E but illustrate the wave shapes which occur when the transducer is off the test specimen. The output E' of the flip-flop goes negative upon receipt of the interface signal D' at time $T_0$. As long as this signal is negative, no alarm signal is passed by signal gate amplifier 32. Accordingly, the multiple reflections shown in wave form D' (immediately after time $T_4$) resulting from reflections within the tank bottom, will not cause any alarm.

To summarize the operation of this invention, a signal gate is generated only when an interface signal appears within a preselected zone of operation. This operation zone is not critical and may lie anywhere between the surface of the transducer and the tank bottom. When the transducer is over the test specimen, the system operates in the usual manner, with the interface signal synchronizing the circuit and any defect signals passing to the recorder and the alarm. However, as soon as the transducer goes off the edge of the test specimen, no interface signal will appear within the interface zone so that no signal gate is generated. Under these circumstances, no signal will pass to the recorder and alarm. At the same time, a signal is receive by the reversing relay which causes reversal of the scan. As soon as the transducer returns to a position over the test specimen, normal testing resumes.

It will be apparent, to those skilled in the art, that a number of advantages accrue from this invention in addition to those specifically pointed out above. For example, the same signals that perform the testing functions are also used for controlling the reversing motor. Furthermore, even without the automatic reversing feature, important advantages result because scanning can be conducted either on or off the test specimen without causing any alarm except in the presence of a defect.

It will also be apparent to those skilled in the art that a number of variations and modifications of this invention may be made without departing from its spirit and scope. Accordingly, it is to be understood that the foregoing description is illustrative only rather than limiting. This invention is limited only by the scope of the following claims.

What I claim as new and desire to secure by Letters Patent of the United States is:

1. Ultrasonic inspection apparatus which comprises: rate generator means adapted to generate periodic timing pulses of electrical energy; pulse generator means responsive to the output fo said rate generator means to generate a radio frequency pulse in response to each timing pulse; an electro-mechanical transducer in energizable relationship from said pulse generator means and positioned to direct mechanical wave energy into a workpiece through an entrant surface thereof and to receive reflected mechanical wave energy therefrom to produce electrical echo signals corresponding thereto; a normally closed interface gate amplifier connected to receive the electrical echo signals from said transducer; a normally closed signal gate amplifier connected to receive the electrical echo signals from said transducer; interface gate control means connected to open said interface gate amplifier; delay means connected to receive timing pulses from said rate generator means and energize said gate control means a predetermined time after each of said timing pulses; bistable signal generating means responsive to said rate generator means to produce a first stable output upon receipt of a timing pulse therefrom and responsive to said interface gate amplifier to produce a second stable output upon receipt of transducer electrical echo signals passed therethrough; signal gate control means connected to open said signal gate amplifier in response to a second stable output from said bistable generating means; utilization means actuatable by electrical echo signals from said transducer passed through said signal gate amplifier; and transducer scanning control means responsive to the output of said bistable signal generating means to vary the relative scanning pattern between said transducer and said workpiece after continuation of a first stable output for a preselected time period.

2. The apparatus of claim 1 wherein said transducer and said workpiece are separated by a liquid coupling agent.

3. The apparatus of claim 1 wherein said workpiece is immersed in a water filled tank and wherein said transducer is movably mounted above said workpiece and below the surface of the water.

4. The apparatus of claim 3 wherein said transducer scanning control means comprises motor means operably linked to said transducer.

5. The apparatus of claim 4 wherein said bistable signal generating means comprises a flip-flop and wherein said delay means comprises a multi-vibrator.

6. An ultrasonic inspection system for inspecting a workpiece for internal defects, said system including
   an immersion tank having a bottom and containing a liquid couplant, said tank being effective to retain the workpiece submerged in said couplant and in a test position adjacent said bottom,
   transducer means disposed in said couplant for transmitting a beam of ultrasonic energy through said couplant and toward an entrant surface on said workpiece, said transducer means being effective to receive echoes of said energy reflected from the interface between the couplant and the entrant surface of the workpiece and from any discontinuities inside of said workpiece,
   scan means for moving the transducer means through the couplant whereby the beam travels across said entrant surface along a series of scan lines,
   receiving means coupled to the transducer means and responsive to echoes occurring at a range corresponding to the range of the interface, and
   control means coupled to the receiving means and the scan means, said control means being effective to cause the scan means to scan the beam along the next scan line when an echo is not received from the interface.

7. An ultrasonic inspection system for inspecting a workpiece for internal defects, said system including
   means for retaining a workpiece having a front and back surface in a test position,
   transducer means for transmitting a beam of ultrasonic energy toward the front surface of said workpiece,
   transmitter means for intermittently energizing the transducer means whereby said ultrasonic energy is transmitted in the form of pulses,
   said transducer means being effective to receive echoes and produce signals corresponding to energy reflected from said front surface and from any discontinuities within said workpiece,
   scan means for moving the transducer means relative to said workpiece whereby the beam transmitted from the transducer means scans said entrant surface along a series of scan lines, a first gate coupled to the transmitter means and to the transducer means for opening and passing signals occurring during an interval including the expected time for the transducer to receive an echo from the entrant surface, control means coupled to said first gate means and responsive to signals passed through said gate means, said control means being coupled to the scan means and effective to actuate the scan means whereby the transducer means commences scanning along a new scan line when a signal is not coupled through said gate means, second gate means coupled to the transducer means for opening and passing signals occurring during a gating interval including the expected time for the transducer to receive echo signals corresponding to defects within the workpiece, and output means coupled to said second gate and responsive to signals passed by said second gate to indicate a defect within the workpiece.

8. An ultrasonic inspection system for inspecting a workpiece for internal defects, said system including means for retaining a workpiece having a front and back surface in a test position, transducer means for transmitting a beam of ultrasonic energy toward the front surface on said workpiece, transmitter means for intermittently energizing the transducer means whereby said ultrasonic energy is transmitted in the form of pulses, said transducer means being effective to receive echoes and produce signals corresponding to energy reflected from said front surface and from any discontinuities within said workpiece, scan means for moving the transducer means relative to said workpiece whereby the beam transmitted from the transducer means scans said entrant surface along a series of scan lines, a gate coupled to the transmitter means for opening and passing signals occurring during an interval including the expected time for the transducer to receive an echo from the entrant surface, control means coupled to said gate means and responsive to signals passed through said gate means, said control means being coupled to the scan means and effective to actuate the scan means whereby the transducer means commences scanning along a new scan line when a signal is not coupled through said gate means, and means coupled to said transducer means and responsive to signals corresponding to echoes reflected from any discontinuities within the workpiece.

9. An ultrasonic inspection system for inspecting a workpiece for internal defects, said system including transducer means for transmitting a beam of ultrasonic energy toward an entrant surface on said workpiece, transmitter means for intermittently energizing the transducer means whereby said ultrasonic energy is transmitted in the form of pulses, said transducer means being effective to receive echoes of said energy reflected from said entrant surface and from any discontinuities within said workpiece, scan means for moving the transducer means relative to said workpiece whereby the beam from the transducer means scans said entrant surface along a series of scan lines, a gate coupled to the transmitter means for opening during an interval including the expected time for the transducer to receive an echo from the entrant surface, and control means coupled to said gate means and to the scan means, said control means being effective to actuate the scan means whereby the transducer means commences scanning along a new scan line when an echo pulse is not coupled through said gate means during said gate interval.

10. An ultrasonic inspection system for inspecting a workpiece for internal defects, said system including means for retaining the workpiece in a test position, transducer means for transmitting ultrasonic energy toward an entrant surface on said workpiece, said transducer means being effective to receive echoes of said energy reflected from said entrant surface and from any discontinuities inside of said workpiece, scan means for moving the transducer means relative to said workpiece whereby the transducer means scans said entrant surface along a series of scan lines, and means responsive to echoes from the entrant surface, said last means being coupled to the scan means and effective to cause the transducer means to commence scanning the entrant surface along another scan line when an echo is not received from the interface.

11. An ultrasonic inspection system for inspecting a workpiece said system including, transducer means for transmitting a beam of ultrasonic energy onto an entrant surface on the workpiece and receiving echoes of said energy reflected from the entrant surface, scanning means coupled to said transducer means for scanning said beam along a series of scan lines extending across said entrant surface, and control means coupled to the transducer means and responsive to the echoes received from the entrant surface, said control means being coupled to said scanning means and effective to actuate the scan means when an echo is not received from the entrant surface whereby the beam is scanned along the next scan line.

References Cited by the Examiner

UNITED STATES PATENTS

| | | | |
|---|---|---|---|
| 2,883,860 | 4/1959 | Henry | 73—67.9 |
| 3,028,751 | 4/1962 | Joy | 73—67.8 |
| 3,164,007 | 1/1965 | Stebbins et al. | 73—67.9 |

RICHARD C. QUEISSER, *Primary Examiner.*

J. J. GILL, *Assistant Examiner.*